United States Patent [19]

Greenberg

[11] Patent Number: 5,205,446
[45] Date of Patent: Apr. 27, 1993

[54] FISHING POLE HOLDER/CARRIER FOR USE WITH A VEHICLE

[76] Inventor: Philip J. Greenberg, 20622 Superior St., Unit 6, Chatsworth, Calif. 91311

[21] Appl. No.: 645,823

[22] Filed: Jan. 25, 1991

[51] Int. Cl.⁵ ............................................ B60R 9/00
[52] U.S. Cl. ......................... 224/42.03 A; 224/42.08; 224/42.45 R; 224/922
[58] Field of Search ............. 224/922, 42.45 R, 42.08, 224/42.44, 42.03 R, 42.21, 42.03 A; 43/21.2; 211/70.8

[56] References Cited

U.S. PATENT DOCUMENTS

| | | | |
|---|---|---|---|
| 2,854,147 | 9/1958 | Derr | 211/70.8 |
| 4,089,448 | 5/1978 | Traeger | 224/42.03 R |
| 4,676,414 | 6/1987 | DeGuevara | 224/42.03 R |
| 4,871,099 | 10/1989 | Bogar, Jr. | 224/922 |
| 5,024,737 | 10/1991 | Delancey | 43/21.2 |
| 5,033,223 | 7/1991 | Minter | 43/21.2 |

Primary Examiner—Linda J. Sholl
Attorney, Agent, or Firm—Edward E. Roberts

[57] ABSTRACT

A fishing pole holder/carrier apparatus for attachment to a vehicle, the apparatus including, in a first embodiment, a main support tube configured, at a first end, for being received within a trailer hitch receptacle. A second member is pivotally attached at one end to the other end of the main support member, and pivotable to a prescribed angular orientation. A cross-member is pivotally coupled at the center thereof to the other end of the second member. Secured to the cross-member are a plurality of tubes configured for receiving the handles of the fishing poles therein. The parts are arranged so that the cross-member may be pivoted between a first position aligned with the second member to a second position transverse to the second member, and the second member may be pivoted to overly the main support member whereby the holder folds to a compact unit for storage. In a second embodiment, the second member is secured to the first member, with the cross-member bolted to the second member. The attachment end of the support member is configured for coupling to an adapter, which may be attached to the bumper or to the side door of a vehicle.

20 Claims, 3 Drawing Sheets

FISHING POLE HOLDER/CARRIER FOR USE WITH A VEHICLE

BACKGROUND OF THE INVENTION

The background of the invention will be discussed in two parts.

1. Field of the Invention

This invention relates to a fishing pole holder, and more particularly to a fishing pole holder/carrier for detachably coupling to a vehicle or a support thereon.

2. Description of the Prior Art

Fishing is a very popular sport. Most avid fisherman have many fishing rods of different sizes and lengths, each having an intended purpose for different fish and fishing conditions. On one fishing expedition, a fisherman may take several rods along for personal use; and, in many instances may take along several rods for family members or others in the fishing party. Fishing rod transporters or carriers and holders are popular accessories with fisherman. Some fishing rods, such as for deep sea fishing tend to be rather long, bulky and weighty, with these physical dimensions making transport of these within a vehicle somewhat cumbersome.

One such fishing rod carrier is disclosed in U.S. Pat. No. 2,835,424, entitled "Fishing Pole Carrier for Automobiles", such patent issuing on May 20, 1958 to Pierce, the device being configured and adapted for attachment at the lower end to the front bumper of an automobile with the upper end having a clamp for retaining a pair of rod handles with the rods extending rearwardly and upwardly relative to the body of the automobile.

Other vehicular attachments for supporting elongate objects are shown and described in the following; U.S. Pat. No. 1,564,703, entitled "Holder" (for a flag or the like), which patent issued to Nichols on Dec. 8, 1925; U.S. Pat. No. 2,533,837, entitled "Vehicle Bumper and Adjustable Pipe Rack", which issued to Pauley on Dec. 12, 1950; U.S. Pat. No. 2,646,909, entitled "Side Rack for Vehicles", (for holding pipe or lumber), such patent issuing to Barden on Jul. 28, 1953; and U.S. Pat. No 4,785,980, entitled "Ski Carrier", such patent issuing to Redick on Nov. 22, 1988.

Other fishing rod carriers or holders are shown and described in the following: U.S. Pat. No. 2,607,398, entitled "Combined Stool and Fishing Rod Support", which patent issued to Andrews on Aug. 19, 1953; U.S. Pat. No. 3,385,544, entitled "Dual Rod and Reel Holder", which issued to Barnett on May 28, 1968; U.S. Pat. No. 4,682,438, entitled "Fighting Chair and Rod Holder", such patent issuing to Arrow on Jul. 28, 1987; U.S. Pat. No. 4,782,624, entitled "Fisherman's All Purpose Boat Mounted Stand", such patent issuing to Head on Nov. 8, 1988; and U.S. Pat. No. 4,835,896, entitled "Lawn Chair Fish Fighter", such patent issuing to Bowen on Jun. 6, 1989.

In accordance with an aspect of the invention, there is provided a holder or carrier for fishing rods which may be coupled to the tubular socket of a trailer hitch or to another attachment mounted to the vehicle.

SUMMARY OF THE INVENTION

The foregoing and other objects of the invention are accomplished by providing a fishing pole holder/carrier apparatus for attachment to a vehicle, the apparatus including, in a first embodiment, a main support tube configured, at a first end, for being received within a trailer hitch receptacle. A second member is pivotally attached at one end to the other end of the main support member, and pivotable to a prescribed angular orientation. A cross-member is pivotally coupled at the center thereof to the other end of the second member. Secured to the cross-member are a plurality of tubes configured for receiving the handles of the fishing poles therein. The parts are arranged so that the cross-member may be pivoted between a first position transverse to the second member to a second position aligned with the second member, and the second member may be pivoted to overly the main support member whereby the holder folds to a compact unit for storage.

In a second embodiment, the second member is secured to the first member, with the cross-member bolted to the second member. The attachment end of the support member is configured for coupling to an adapter, which may be attached to the bumper or to the side door of a vehicle.

Other objects, features and advantages of the invention will become readily apparent from a reading of the specification, taken in conjunction with the drawings, in which like reference numerals refer to like elements in the several views.

DESCRIPTION OF THE PREFERRED EMBODIMENT

Figure 1:
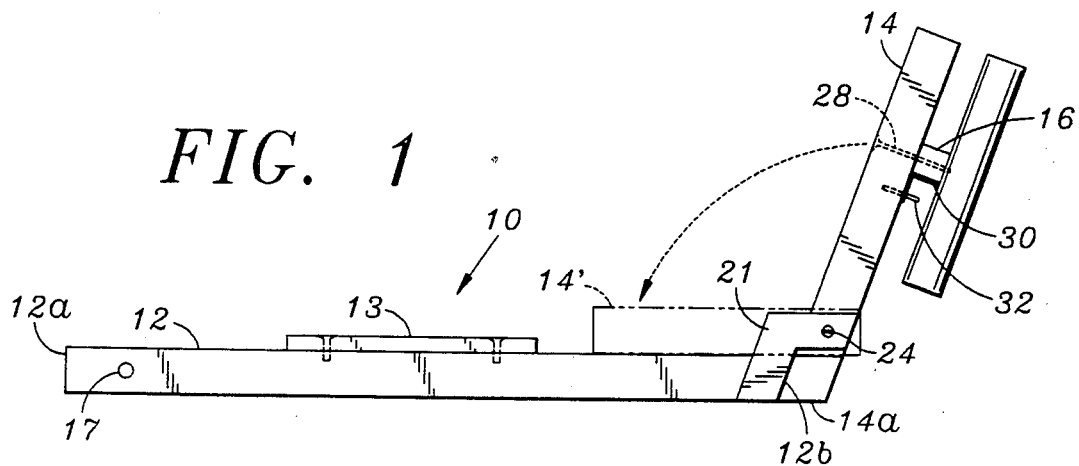
FIG. 1 is a side elevational view of a fishing rod holder/carrier apparatus in accordance with the invention.
Figure 2:
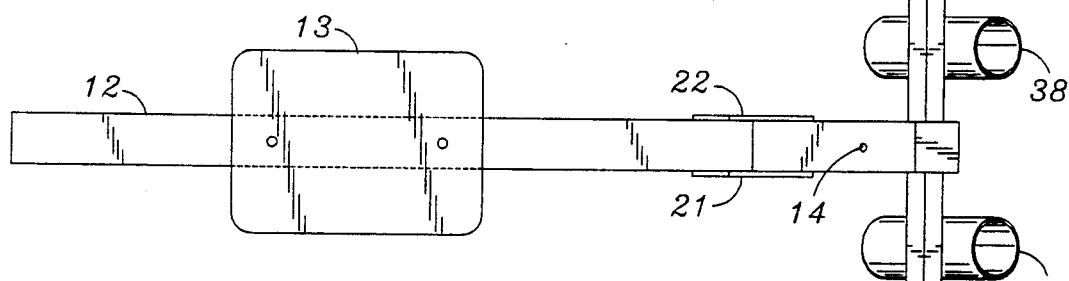
FIG. 2 is a top plan view of the apparatus of FIG. 1.
Figure 3:
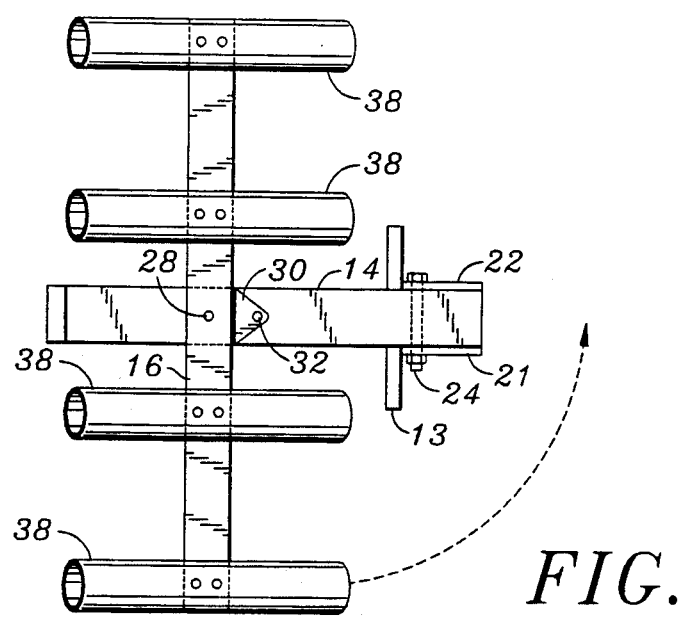
FIG. 3 is a rear view of the apparatus of FIG. 1 as viewed from the right side of the view of FIG. 2.

Referring now to the drawings, and particularly to FIGS. 1 through 3, there is shown a first embodiment of a collapsible fishing rod holder/carrier apparatus, generally designated 10, which is suitable for connection to the square tubular receptacle of a standard trailer hitch (not shown) of a vehicle. The apparatus includes a main support member 12, a second member 14, and a cross-member 16, each of which is formed of tubular metal of a square or rectangular cross-section.

The main support member 12 is a generally square tubular member having a first end 12a with a transversely extending hole 17 therethrough a distance from the distal end, the hole 17 being dimensioned for receiving the latch pin of the hitch. A plywood platform 13 is bolted along its centerline to the upper surface of the main support member 12 for use in carrying auxiliary devices, such as a fishing box, or the like.

The other end 12b of main support member 12 is cut at an obtuse angle and has first legs of angle brackets 21, 22 welded to the side surfaces thereof. The first legs of the brackets 21, 22 extend upwardly (as viewed in FIG. 1) along the angle of the end 12b, with the other legs then extending rearwardly on a line parallel to the longitudinal centerline of the main support member 12. The upright, or second support member 14 is likewise formed of a square cross-sectioned tubular metal of the same dimension as the support member.

The lower end 14a of the second member passes into the space between the legs of the angle brackets 21, 22 and is pivotally attached, such as by a bolt 24 passing through the legs and through the second member 14. With the upwardly extending position of the angle brackets 21, 22, the member 14 may be rotated counterclockwise (as viewed in FIG. 1) to the broken line position 14', whereupon it lies in abutting relation with the main support member 12.

The cross-member 16 is a generally rectangular tubular member and is pivotally attached, at its midpoint, to the upper end of the second or upright member 14 by means of a hinge pin or bolt 28. As more clearly shown in FIG. 1, a short piece 30 of angle iron or the like is secured to the cross member 16 at the underside of the midpoint, the lower leg of the piece lying adjacent the upright member 14 and having an aperture therethrough in alignment with a like dimensioned aperture in the upright member 14 for removably receiving a fastener or lock pin 32.

The lock pin 32, as shown in FIGS. 1 and 3, holds the cross member 16 in transverse or perpendicular relation relative to the upright member 14. When the pin 32 is removed, the cross-member 16 may be rotated 90 degrees to a position in general alignment with the upright member 14 and, with the member 14 depressed as shown in broken lines at 14' (FIG. 1), all three members will be in alignment with one another, that is, collapsed for storage.

A plurality of tubular members 38 are secured, such as by welding or fasteners to the cross-member 16, two being shown on each side of the midpoint in a symmetrical manner, these tubular members 38 being located outboard of the cross-member 16 so as not to interfere with the collapsible nature of the apparatus. The inner diameters of the tubular members 38 are sufficient for receiving therein handles of fishing poles (not shown).

Figure 4:
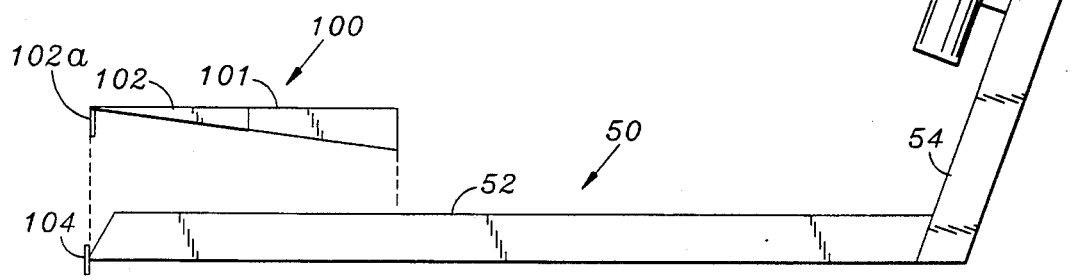
FIG. 4 is, in side view, an alternative embodiment of the apparatus of FIG. 1 showing, in exploded relation therewith, a mounting assembly.
Figure 5:
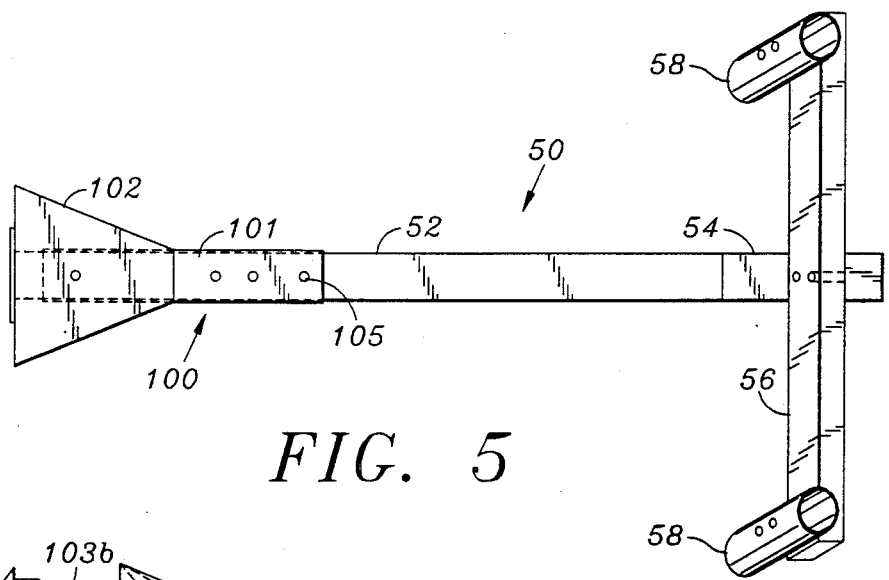
FIG. 5 is a top plan view of the apparatus of FIG. 3.
Figure 6:
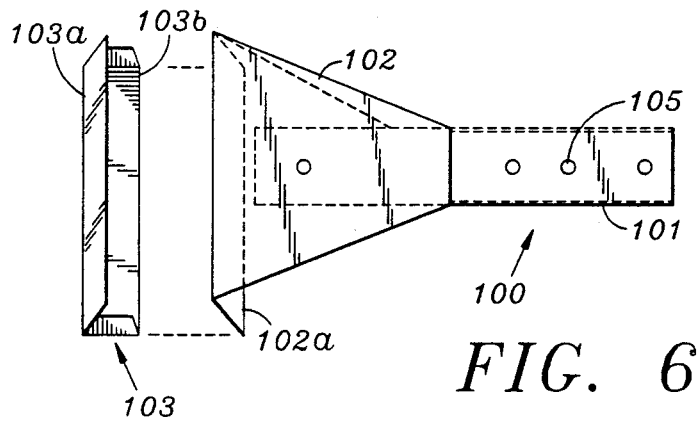
FIG. 6 is a top plan view of the mounting assembly of the apparatus of FIG. 4.
Figure 7:
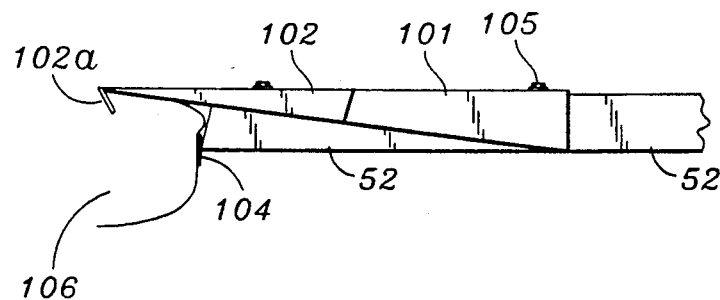
FIG. 7 is a side view of illustrating mounting of the apparatus of FIG. 4 onto the bumper of a vehicle.

FIGS. 4 through 6 depict an alternate embodiment in which the fishing pole holder/carrier apparatus, generally designated 50, may be detachably secured to the front, rear or side of a vehicle. In this embodiment, the apparatus 50 includes a main support member 52, which may be tubular of square cross-section. The upright or second member 54 is generally formed of the same dimensioned material and is suitably secured, such as by welding, at one end of the main support member at an obtuse angle approximating 105 degrees.

A cross member 56 is secured such as by welding or bolts at its midpoint along a line perpendicular to the longitudinal centerline of the upright member 54. A number of fishing pole handle receiving tubes 58 are secured, such as by bolts, to the cross-member 56. Two such tubes 58 are shown adjacent opposite ends of the cross-member 56.

Shown if FIGS. 4–8 is means, generally designated 100, for attaching the pole holding apparatus to the bumper, or onto a vehicle in an open doorway such as the sliding door of a van or the like.

In attachment to a bumper (FIG. 7), the means for attachment is comprised of channel member 101 and fan member 102. For attachment in an open door (FIG. 8) there is further included bracket 103.

As shown, fan member 102 has a first end for mounting, such as by welding, onto channel member 101, and a flared out second end having a downwardly extending portion 102a at an acute angle to the top plane of the fan member for hooking over the bumper 106 of the vehicle. The combination of channel member 101 and fan member 102 is configured for fitting over the top of main support member 52 and bolted, or otherwise secured, thereto.

Into side view, after mounting onto support member 52, the combination of channel member 101 and fan member 102 slopes rewardly and upwardly to portion 102a in the manner of a hook for enabling portion 102a to hook over the bumper. Support member 52 extends underneath the combination a variable distance to include a butt plate 104 for resting against the front of the bumper.

The combination is adjustable on member 52 by means of a plurality of suitable mounting devices 105, such as bolt or Plus-Nut (Reg. Trademark) to insure secure positioning of the butt plate 104 in abutting engagement against bumper 106 after portion 102a is hooked over the bumper. The Plus-Nut is a fastening device with a threaded hole, the device threaded into the hole and then pulled up or squeezed with a special tool for retention.

Figure 8:
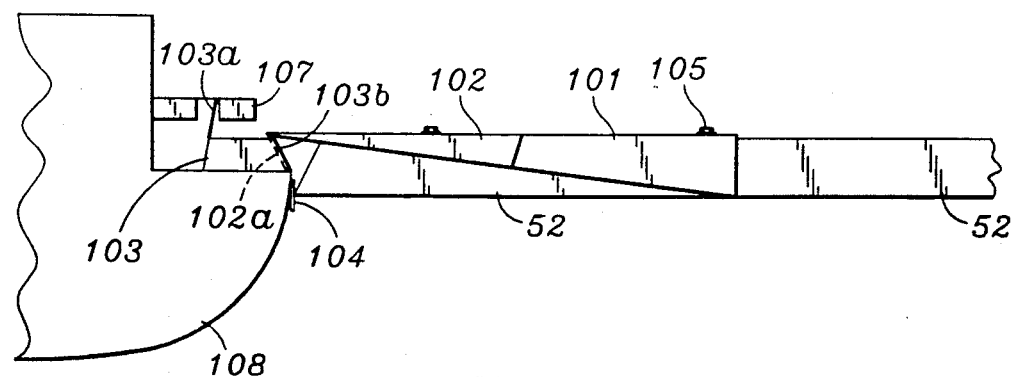
FIG. 8 is a side view of illustrating mounting of the apparatus of Fig. 4 into the open doorway of a vehicle.

For mounting onto a vehicle in an open doorway, bracket 103 is provided as shown in FIGS. 6 and 8. Bracket 103 is in the form of trough having a back side 103a for fitting under the door railing 107 of the vehicle 108, thereby retaining itself to the vehicle.

In mounting the pole holder to the vehicle, the combination of channel member 101 and fan member 102 is adjusted on support member 52 by suitable means so that when hook portion 102a is placed into the trough of bracket 103 behind bracket frontside 103b, the lowering of the combination will effect that butt plate 104 is securely positioned against the vehicle below bracket 103.

Either embodiment may be configured for coupling to the adapter as disclosed herein which is comprised of the members 101–103 as desired, or each may be configured as described for attachment to a conventional trailer hitch.

While there has been shown and described a preferred embodiment, it is to be understood that various other adaptations and modifications may be made within the spirit and scope of the invention.

What I claim is:

1. A collapsible fishing pole holder/carrier for coupling to a vehicle, said apparatus comprising.
    an elongate main support member having a first end configured for being detachably mounted to a coupler secured to a vehicle and to extend in a cantilevered manner from said vehicle;
    a second elongate support member attached at a first end thereof to the other end of said main support member in a manner to extend upwardly therefrom, said second member having attachment means for selectively collapsing said second member to overlie said main member;
    a cross-member coupled adjacent to the other end of said second member in substantially transverse relation thereto and having attachment means for rotating said cross-member into substantial alignment with said second support means; and
    fish pole handle receiving means secured to said cross-member for receiving and retaining fishing poles.

2. The apparatus according to claim 1 wherein said second support member is attached to said main support member by means configured for enabling said second support member to be selectively rotated toward said vehicle to a collapsed position overlying said main support member.

3. The apparatus according to claim 2 wherein said cross-member is attached substantially at its midpoint to said second support member and includes means for enabling selective pivoting of said cross-member into general longitudinal alignment with said second support member whereby upon rotation of second support member to overly said main member, the combination of said cross-member and said second support member are collapsed into substantially abutting longitudinal alignment with said main member.

4. The apparatus according to claim 1 further including coupling means for attachment of said first end of said main support member to a vehicle.

5. The apparatus according to claim 1 further including coupling means for attachment of said first end of said main support member to the bumper of a vehicle.

6. The apparatus according to claim 1 further including coupling means for attachment of said first end of said main support member onto a vehicle at an open door thereof.

7. The apparatus according to claim 5 wherein said coupling means comprises a hook shaped member attached at one end to said first end of said main support member and at the other end thereof hooks over the top of said bumper.

8. The apparatus according to claim 7 wherein said main support member further includes butt plate means at said first end thereof for abutting relationship with said bumper toward the bottom thereof.

9. The apparatus according to claim 6 further including bracket means having a first portion thereof for fitting securely onto said vehicle and said coupling means comprises a hook shaped member attached at one end to said first end of said main support member and at the other end thereof hooks over a second portion of said braket means to thereby attach said apparatus to the vehicle.

10. The apparatus according to claim 9 wherein said main support member further includes butt plate means at said first end thereof for abutting relationship with said vehicle below the contact point on said vehicle of said bracket.

11. The apparatus according to claim 1 wherein said main support member, said second support member , and said cross-member are configured and respectively attached for enabling said cross-member to be pivotally aligned to said second support member, and the combination of said cross-member and said second support member to be rotated to a position overlying said main support member, such that said cross-member, said second support member, and said main support member are in collapsed substantially abutting longitudinal alignment with one another.

12. The apparatus according to claim 11 wherein said main support member is a generally square tubular member and includes platform means mounted on the upper surface thereof for carrying auxiliary equipment.

13. The apparatus according to claim 11 wherein said apparatus further includes means for locking said cross-member in aligned relation with said second support member.

14. The apparatus according to claim 13 wherein said second support member is a generally square tubular member, said cross-member is a generally rectangular member, and said fish pole receiving means includes a plurality of tubular members mounted outboard of said cross-member so as not to interfere with the collapsible nature of said apparatus.

15. The apparatus according to claim 1 further including coupling means for attachment of said first end of said main support member onto a vehicle at an open door thereof.

16. The apparatus according to the claim 4 wherein said coupling means comprises a hook shaped member attached at one end to said first end of said main support member and at the other end thereof hooks over the top of the vehicle bumper.

17. The apparatus according to claim 15 further including bracket means having a first portion thereof for fitting securely onto said vehicle and said coupling means comprises a hook shaped member attached at one end to said first end of said main support member and at the other end thereof hooks over a second portion of said bracket means to thereby attach said apparatus to the vehicle.

18. Fishing pole holder/carrier apparatus for coupling to a vehicle, said apparatus comprising:
a first support member, configured for detachable coupling at a first end thereof to a vehicle, and for supporting said apparatus substantially horizontally cantilevered from said vehicle;
a second support member attached at a first end thereof to the other end of said main support means and extending upwardly therefrom, said second member having attachment means for selectively collapsing said second member to overlie said first member;
a third support member, attached adjacent to the other end of said second support member in substantially transverse relation thereto and having means of attachment to said second member for selectively pivoting said third support member into substantial alignment with said second support means; and
fish pole handle receiving means secured to said third support member in a substantially vertical orientation for receiving and retaining fishing poles.

19. The apparatus according to claim 15 wherein in said first, second, and third support members are configured with respective attachment means for enabling said third member to be pivoted about its attachment means to said second support means into alignment with said second support member, and said second support member to be collapsed through its attachment means to said main support means to a position overlying said first support member, such that said first, second and third members are in collapsed abutting longitudinal alignment with one another.

20. The apparatus according to the claim 19 wherein said first, second, and third support members are four-sided tubular members, and said fish pole handle receiving means includes a plurality of tubular members mounted outboard of said third support member so as not to interfere with the collapsible nature if said apparatus.

* * * * *